United States Patent Office 2,907,864
Patented Oct. 6, 1959

2,907,864

WELDING OF STEEL

Gilbert R. Rothschild, Somerville, and Harold R. Lyons, Short Hills, N.J., assignors to Air Reduction Company, Incorporated, New York, N.Y., a corporation of New York No Drawing. Application October 21, 1954
Serial No. 463,819

5 Claims. (Cl. 219—74)

This invention relates to the electric arc welding of steels and particularly to the welding of structural grade steels, such as rimmed or semi-killed steels, by a welding method which includes the use of an inert-gas-shielded electric arc and a bare, consuming ferrous wire electrode.

The welding of rimmed or semi-killed steel is complicated by what is known by the "rimming" action. This action occurs in steels which contain appreciable amounts of oxygen in the form of iron oxide. When the steel is melted during welding, it is believed that the carbon in the steel reduces the iron oxide to iron and carbon monoxide. The evolution of carbon monoxide in the molten weld metal is believed to cause porosity in the weld due to entrapment of the carbon monoxide bubbles in the weld metal upon solidification. The problem is further complicated by the fact that, in some welding of steels, it has been discovered that improved results are obtained by the high-speed, inert-gas-shielded, metal arc, consuming electrode method if the shielding gas has small oxygen additions. It is apparent that the oxygen additions to the shielding gas or the oxygen in the gas shield tend to increase the possibility of rimming action and will adversely affect any rimming-preventative or strengthening additions, such as manganese and silicon, to the welding electrode wire since such additions are subject to oxidation. A further consideration involves the necessity of keeping the cost of the wire low by avoiding expensive raw materials in the wire or expensive production methods for the wire. Another significant factor in the inert-gas-shielded, metal arc, consuming-electrode welding process is the effect of the wire composition on the arc since, if the arc is adversely affected, the result would be deterimental to the soundness of the weld.

Prior to the instant invention, it was known that manganese and silicon, when added to a weld pool formed in part from steel containing appreciable amounts of carbon and oxygen, tended to reduce porosity. Certain ferrous wire compositions containing manganese and silicon have been used for submerged-arc electrodes. The tips of these electrodes are submerged in fluxes which, when subjected to the arc heat, are primarily intended to protect the arc and the weld pool from the atmosphere. However, the selection of an electrode composition for inert-gas-shielded arc welding presented a problem different from the one encountered in shielded metal arc using coated stick electrodes or flux-submerged arc welding. The fluxes used in these latter two processes provide control over the freezing rate of the molten pool (thus influencing the escape of gas), the deoxidization of the weld metal, and other factors or variables. In the inert-gas-process, the wire composition must be suitable for use with various inert shielding gases and welding techniques since these variables can be changed to a greater extent in the inert-gas process than in the shielded metal arc or submerged arc welding. It was apparent that the wire compositions of prior, submerged arc or coated stick electrodes were only an indication of wire compositions which might be useful in the inert-gas process. Obviously, there was no assurance that the interaction of the arc, wire ingredients, and shielding gas would result in suitable welding conditions and strong welds.

The object of the instant invention is to provide a general purpose, ferrous welding wire and, further, a welding method which will avoid the above-mentioned difficulties and will permit the high-speed, inert-gas-shielded metal arc welding of structural grade steel, using a consuming electrode.

A further object is the provision of relatively inexpensive ferrous welding wire which is especially suitable to serve as the consuming electrode wire in the welding of carbon and low alloy steels by means of the metal arc process which utilizes an inert gas shield having oxygen additions.

The accomplishment of the foregoing objects and others, along with the features and advantages of the invention, will be apparent from the following description.

According to the present invention, we have found that rimmed and semi-killed steel can be welded with sound, strong weld metal by inert-gas-shielded electric arc processes using a bare consuming electrode wire composed principally of iron containing specific proportions of carbon, manganese and silicon. After extensive tests, it was discovered that a specially-killed, steel wire containing approximately, by weight, carbon 0.13%, manganese 1.10%, silicon 0.47% and the balance being substantially all iron, would prevent porosity, give strong welds and would not adversely affect the arc in inert-gas-shielded, metal-arc, metal-spray-transfer welding processes having different shielding gases and types of welding currents. This wire has the preferred composition.

Best results are obtained with the instant wire in welding structural grade steel when (1) the welding current is direct current reverse polarity (that is, the work is negative with respect to the electrode); (2) the non-turbulent, shielding gas is argon with a 1–2% oxygen addition; (3) the wire feed is in excess of 100 inches per minute; and (4) the welding current and wire feed are such as to project molten metal from the wire electrode to the workpiece in the form of a spray of fine discrete droplets (metal spray transfer). These features constitute the preferred form of the instant invention.

The instant balance of carbon, manganese, and silicon in the electrode wire was discovered after due consideration was given to effects on the arc, porosity, weld strength and ductility, the desired low-carbon level, and the melting practices for making killed steel and after excessive porosity resulted when direct current, straight-polarity (electrode is negative) was used with a shielding gas containing a small amount of oxygen. Thus, since a low-carbon level was desired, the manganese was decreased to maintain a reasonable manganese-to-carbon ratio and so any possible need for an expensive low-carbon ferro-manganese alloy additive when making steel was avoided. The silicon was brought to a high level to assure sufficient deoxidation even under conditions extremely favorable to rimming and particularly to avoid excessive porosity when welding rimmed steel or when welding with an argon-oxygen shielding gas where the oxygen tends to burn out the deoxidizer intended for the weld pool.

The Muller et al. Patent No. 2,504,868 (issued April 18, 1950; assigned to applicants' assignee) discloses apparatus and certain method features which are particularly suitable for use with the present invention. Thus, according to the above-mentioned preferred form of the instant invention, a direct current, reverse-polarity arc is struck between the end of the instant wire and the ferrous workpiece and the wire is fed continuously toward the work as it is consumed and transferred as a metal spray across the arc into the molten weld pool. The arc and weld pool are shielded by a non-turbulent, laminar-flow stream of argon containing 1–2% oxygen so that air is excluded from the arc, the tip of the electrode wire, and the weld pool. The oxygen addition is made to give a wetting action so that the weld contour is improved.

The advantages of the instant invention and properties of weld deposits made with the instant wire were first determined by making butt joints with ¾ inch, semi-killed, ASTM A285, grade C steel plate. The percentage composition of this plate was as follows:

| | |
|---|---|
| Carbon | 0.20 |
| Manganese | 0.57 |
| Silicon | 0.18 |
| Sulfur | 0.04 |
| Phosphorus | 0.021 |

A single-V groove was used having a 60-degree included angle. A mild steel backing having a composition similar to the base plate was used. The plate bevels were prepared by oxy-acetylene cutting and grinding. An extra bright clean wire finish was maintained. The electrode wire diameter was ¹⁄₁₆ inch. The welding was done with a manual welding gun. The gun was always held at 10 to 15 degrees from the vertical for both forehand and backhand welding. Standard direct current arc welding power supplies of either the motor generator or rectifier type were used and are suitable. The average wire composition included the above-mentioned quantities of carbon, manganese, and silicon and sulfur—0.022% and phosphorous—0.022%. Residual elements were nickel—0.02%, chromium—0.02% and vanadium—0.04%, to a total of less than 0.1%.

When argon having 1% oxygen addition and direct current reverse-polarity were used with a welding current of 300–400 amperes and an arc voltage of 25–26 volts, weld metal was obtained having a composition of carbon 0.09–0.12%; manganese 0.82–0.90%; and silicon 0.34–0.37%. The porosity-free weld metal had a tensile strength of 72–78,000 p.s.i.g.; an elongation in 2 inches of 22–29%; and a Brinell hardness of 145–165. Highly satisfactory welding of rimmed steel was also accomplished with the instant invention. Porosity-free welds having the required strength and other required properties were consistently obtained. It is to be appreciated that killed steels also can be welded with the instant invention and that suitable welds result. With killed steels, there is less chance of porosity since most oxygen has been removed from the steel during the deoxidation; but of course, it is still necessary to obtain a strong weld deposit, especially if there is oxygen in the gas umbrella around the arc. Thus, it is to be understood that carbon steels (rimmed, semi-killed and killed steels) can be welded very satisfactorily with the instant invention.

Other tests made with the instant wire and manual and automatic equipment, using the preferred welding method, established comparable weld metal properties and welding conditions. These tests were made with mild steel workpieces which contained less than 0.30% carbon and with low alloy constructional steels which contained less than a 5% total of carbon, manganese, silicon and other materials such as chromium, molybdenum, and nickel.

Typical mechanical properties of all-weld-metal, as-welded specimens from these welds are as follows:

| | |
|---|---|
| Ultimate Tensile Strength, p.s.i. | 76,000 |
| Yield Strength (0.2% offset), p.s.i. | 60,000 |
| Elongation in 2 inches, percent | 25 |
| Reduction of Area, percent | 40 |
| Brinell Hardness | 180 |

Impact Strength—Ft. Lbs.:

| | V-Notch Charpy | Key-Hole Charpy |
|---|---|---|
| Room Temperature: | | |
| 70° F. | 135 | |
| 0° F. | 110 | 39 |
| —20° F. | 100 | 38 |
| —40° F. | 80 | |
| —100° F. | 30 | |

Welds made with the instant welding wire and preferred process met the following specifications:

(1) ASTM–AWS E70XX and (because no hydrogen is present) E7015.
(2) ASME Boiler and Pressure Vessel Code, section IX, 1952 edition.
(3) MIL–E–986a(ships), type MIL–180–15, class 2.

The ranges of preferred welding conditions using argon with 1–2% oxygen additions and direct current, reverse-polarity for various size wire are as follows:

MANUAL WELDING

| Wire Diameter—inches | 0.045 | ¹⁄₁₆ | ⁵⁄₆₄ | ³⁄₃₂ |
|---|---|---|---|---|
| Current—amperes | 150–250 | 275–400 | 350–500 | 400–500 |
| Arc Voltage—volts | 24–28 | 24–28 | 24–28 | 24–28 |
| Gas Flow—c.f.h. | 30–40 | 30–40 | 30–40 | 30–40 |

AUTOMATIC WELDING

| Wire Diameter—inches | 0.045 | ¹⁄₁₆ | ⁵⁄₆₄ | ³⁄₃₂ |
|---|---|---|---|---|
| Current—amperes | 175–250 | 275–650 | 350 Min. | 400 Min. |
| Arc Voltage—volts | 25–28 | 25–30 | 25–32 | 25–32 |
| Gas Flow—c.f.h. | 50–75 | 50–75 | 50–75 | 50–75 |

Wire feed must be in excess of 100 inches per minute and preferably within the range of 140–325 inches per minute depending on the size of the wire. In general, weld speed is correct if the weld puddle does not flow ahead of the arc and the molten pool does not extend beyond the gas shielding umbrella.

The essential proportioning of silicon, manganese, and carbon must be within the following ranges:

| | Percent |
|---|---|
| Carbon | 0.07–0.14 |
| Manganese | 0.90–1.10 |
| Silicon | 0.30–0.60 |

Sulfur and phosphorous should each be less than 0.030%.

From the foregoing, it is apparent that excellent weld metal properties are obtained by using the instant wire in inert-gas-shielded, consuming electrode welding for structural grade steel when the shielding gas is argon with a 1–2% oxygen addition and the welding current is direct current, reverse-polarity.

A very light copper coating for the wire is preferred since it results in a wire which resists deterioration by rusting and does not affect the welding or welding results. The wire, of course, should be smooth and free of drawing lubricants such as soap and oil.

It is to be noted that the carbon, silicon and manganese are proportioned so that special melting practices or expensive ferromanganese alloys are not required.

The instant wire has also proved satisfactory in welding with direct current straight-polarity and a shielding gas of argon plus a small amount of oxygen. The oxygen addition is required in order to obtain proper arc stability. Satisfactory results were also obtained with direct current, straight-polarity using a pure argon shield and rubidium carbonate on the instant wire. The instant wire when coated with rubidium carbonate also was used with success with alternating current at 75 volts (open circuit voltage) and a pure argon shield. However, the welding technique which has been proved most satisfactory for most applications is 99% argon-1% oxygen-shielding gas with reverse-polarity, direct current. The aforementioned wire feed rate, metal spray transfer, and non-turbulent gas shield are always required. The instant wire having the composition above-mentioned is fabricated as a coil of wire and then wound on spools after a conventional coating, redraw, and cleaning operation.

It is to be noted that the instant quantities of carbon, manganese and silicon constitute an essential balancing of the three elements. Manganese and silicon, preferentially to iron, form stable oxides which oxides are not as readily reduced by carbon during the welding as is iron oxide. Of equal importance is the interplay of manganese and silicon in the formation of the complex oxides in the weld pool. It is believed that the instant balancing results in complex oxides which more readily pass to the surface of the weld pool and hence the possibility of solid inclusion in the weld is minimized. It is also believed that the interplay of the manganese and silicon result in the silicon primarily effecting deoxidation while the manganese principally compensates for decreased carbon and contributes to the strength of the weld metal, such as the good impact properties set forth above. The low carbon level increases weldability and results in increased ductility. The balancing of carbon manganese and silicon in the instant wire also gives strong welds when rimming is not a major problem.

For best results, it is required with the instant invention that the weld surfaces be clean, as above-mentioned.

The term "consuming bare electrode" is used to exclude the well-known coated electrodes which have a relatively thick coating of flux and other materials. This term, however, does not exclude the light deposits of emissive coatings, such as rubidium carbonate, or copper dip.

The term "structural grade steel" is intended to mean carbon steels and low alloy constructional steels having less than a 5% total of alloying elements. As understood in the art, carbon steels are steels in which the manganese and silicon contents do not exceed 1.65% and 0.60% respectively. Stainless steels and other high alloy steels are not intended to be included within this term since the possibility of the rimming action is substantially diminished and different welds are desired.

It will be understood that this invention is not limited to the specific illustrative embodiments described above in detail but includes such modifications thereof as fall within the scope of the appended claims.

We claim:

1. The method of welding a structural-grade steel workpiece containing an appreciable quantity of oxygen comprising establishing a welding arc between said workpiece and a consuming bare electrode consisting essentially of iron containing about 0.07% to 0.14% carbon, about 0.90% to 1.10% manganese, and about 0.30% to 0.60% silicon, the amounts of said manganese and silicon being sufficient to prevent any significant rimming action in the weld metal formed on said workpiece; blanketing said arc, the consuming end of said electrode, and the welding zone with a stream of shielding gas containing an inert gas and an oxygen source in an amount sufficient to provide a small but effective quantity of oxygen; advancing the electrode to maintain the arc as metal is transferred from said electrode to said workpiece; and effecting the transfer of said metal as a metal spray.

2. The method according to claim 1 and being further characterized in that direct current is supplied to the electrode and workpiece at reversed polarity, and said electrode is advanced at a rate in excess of 100 inches per minute.

3. The method according to claim 1 and being further characterized in that said shielding gas contains argon and a small but effective amount of oxygen sufficient to provide arc stability and proper weld contour.

4. The method according to claim 3 and being further characterized in that said stream of shielding gas consists of a non-turbulent blanket of argon containing between 1% and 2% oxygen.

5. A coil of bare electrode wire for welding structural-grade steel workpieces and adapted to be consumed in an electric arc which is protected from the atmosphere by an inert shielding gas containing a small but effective amount of oxygen, said wire containing by percentage weight analysis, carbon 0.07% to 0.14%, manganese 0.90% to 1.10%, silicon 0.30% to 0.60%, and the remainder being essentially iron; the amounts of said manganese and silicon being sufficient to prevent any significan rimming action in the weld metal formed on said workpiece; and said wire being smooth and substantially free of drawing lubricants.

References Cited in the file of this patent

UNITED STATES PATENTS

| | | |
|---|---|---|
| 1,452,781 | Becket | Apr. 24, 1923 |
| 1,544,422 | Becket | June 30, 1925 |
| 2,022,307 | Austin | Nov. 26, 1935 |
| 2,053,417 | Brace | Sept. 8, 1936 |
| 2,239,465 | Nepoti | Apr. 22, 1941 |
| 2,504,868 | Muller et al. | Apr. 18, 1950 |
| 2,681,402 | Muller | June 15, 1954 |

FOREIGN PATENTS

| | | |
|---|---|---|
| 1,051,528 | France | Sept. 16, 1953 |
| 709,533 | Great Britain | May 26, 1954 |
| 1,102,303 | France | May 4, 1955 |

OTHER REFERENCES

Fundamentals of Welding, Owens, 1923, pp. 468 and 470.